US008964023B2

United States Patent
Neumann et al.

(10) Patent No.: US 8,964,023 B2
(45) Date of Patent: Feb. 24, 2015

(54) DEVICE AND METHOD FOR MEASURING FORM ATTRIBUTES, POSITION ATTRIBUTES AND DIMENSION ATTRIBUTES OF MACHINE ELEMENTS

(71) Applicant: JENOPTIK Industrial Metrology Germany GmbH, Villingen-Schwenningen (DE)

(72) Inventors: Ernst Neumann, Buergel (DE); Michael Schubert, Jena (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 133 days.

(21) Appl. No.: 13/875,787

(22) Filed: May 2, 2013

(65) Prior Publication Data
US 2013/0300861 A1   Nov. 14, 2013

(30) Foreign Application Priority Data
May 8, 2012   (DE) .......................... 10 2012 104 008

(51) Int. Cl.
*H04N 9/47* (2006.01)
*H04N 7/18* (2006.01)
*G01B 21/02* (2006.01)
*G01B 11/08* (2006.01)
*G01B 11/24* (2006.01)
*G01B 5/28* (2006.01)
(Continued)

(52) U.S. Cl.
CPC ............... *G01B 21/02* (2013.01); *G01B 11/08* (2013.01); *G01B 11/24* (2013.01); *G01B 5/285* (2013.01); *G01B 21/16* (2013.01); *G01B 21/20* (2013.01)

USPC ............ 348/92; 348/135; 700/160; 73/866.5

(58) Field of Classification Search
CPC ............... G01B 11/2488; G01B 11/08; G06T 2207/30164; H05K 13/041; H05K 13/0015
See application file for complete search history.

(56) References Cited

U.S. PATENT DOCUMENTS 5,521,707 A * 5/1996 Castore et al. ................ 356/394
8,138,446 B2 * 3/2012 Chagnot ................... 219/121.63
(Continued)

FOREIGN PATENT DOCUMENTS

DE        3820241 A1   12/1989
DE       40 30 994 A1    4/1992
(Continued)

*Primary Examiner* — Joseph Ustaris
*Assistant Examiner* — Rebecca Volentine
(74) *Attorney, Agent, or Firm* — Patentbar International, P.C.

(57) ABSTRACT

A device and a method for measuring form attributes, position attributes and dimension attributes of rotatable machine elements are described. It is the object of the invention to find a possibility for measuring form attributes, position attributes or dimension attributes of a rotatable machine element which also allows axially probeable surfaces having hidden regions to be measured with high accuracy with a lower expenditure on construction. According to the invention, this object is met in that a mechanical measuring unit having a tactile measuring probe for measuring the machine element in axial direction is provided in addition to an optical measuring unit with illumination module and camera module which captures a shadow image of the machine element. The mechanical measuring unit is fixed to the optical measuring unit and has a swiveling device for swiveling the tactile measuring probe orthogonal to the rotational axis of the machine element.

14 Claims, 8 Drawing Sheets

(51) Int. Cl.
*G01B 21/16* (2006.01)
*G01B 21/20* (2006.01)

(56) References Cited

U.S. PATENT DOCUMENTS

| | | | |
|---|---|---|---|
| 2002/0040611 A1* | 4/2002 | Uwai | 73/866.5 |
| 2002/0043635 A1* | 4/2002 | Yasuda et al. | 250/559.45 |
| 2006/0236792 A1* | 10/2006 | Hanna | 73/865.8 |
| 2006/0242818 A1* | 11/2006 | Penick et al. | 29/560 |
| 2010/0265324 A1* | 10/2010 | Spalding | 348/92 |
| 2010/0286812 A1* | 11/2010 | Slettemoen et al. | 700/160 |
| 2013/0250030 A1* | 9/2013 | Sandstrom et al. | 347/225 |

FOREIGN PATENT DOCUMENTS

| | | |
|---|---|---|
| DE | 60 2005 001 271 T2 | 1/2008 |
| DE | 103 19 947 B4 | 6/2010 |
| EP | 0478898 A2 | 4/1992 |
| WO | 2010/133552 A1 | 11/2010 |

\* cited by examiner

DEVICE AND METHOD FOR MEASURING FORM ATTRIBUTES, POSITION ATTRIBUTES AND DIMENSION ATTRIBUTES OF MACHINE ELEMENTS

RELATED APPLICATIONS

This application claims priority to German Patent Application No. DE 10 2012 104 008.7, filed May 8, 2012, which is incorporated herein by reference in its entirety.

FIELD OF THE INVENTION

The invention is directed to a device and a method for measuring form attributes, position attributes and dimension attributes of rotatable machine elements such as, for example, engine shafts and transmission shafts, thrust rods, valves, pistons, screws, turbine parts, etc.

BACKGROUND OF THE INVENTION

Tactile measuring methods in which surfaces are probed by mechanical probing elements and can be measured very precisely have become established for precise measurement of shafts. However, tactile measuring methods generally require extensive changeover times when changing measuring tasks.

In such cases, optical measuring methods are available. These optical measuring methods generate a shadow image of the shaft by which the outer contour can be measured. Owing to the noncontacting measurement, the machine element can be determined faster and measured with high accuracy. It is possible to alternate easily and quickly between different measuring tasks. A disadvantage of optical measuring devices is that concave surface portions and undercuts, for example, which are not visible in the shadow image cannot be measured.

For these reasons, an optical measuring method and a tactile measuring method can be combined in one device. Patent DE 103 19 947 B4 discloses a device in which circumferential surfaces of shafts are detected by combined application of optical and mechanical measuring units. To this end, the device has a measuring system in which a mechanical-electrical measuring unit is integrated in an optoelectronic measuring unit for measuring the shaft and can be moved out linearly if required. In so doing, a shaft is clamped in the device on the axis of rotation of the shaft. The measuring system has a U-shaped optoelectronic measuring unit whose cantilevering ends are arranged on both sides of the clamped shaft in a first measuring position. Illumination/camera modules operating in the manner of a light barrier are installed in the cantilevering ends. In this way, a shadow image of the shaft is generated and recorded in a known manner, and this shadow image can be used for measuring the shaft. In order to detect the shaft in its entirety, the shaft is rotated around its rotational axis and the optoelectronic measuring unit is moved along the shaft parallel to the axis of rotation. To heighten measuring accuracy, an additional measurement of the circumferential surfaces of the shaft can then be carried out by the mechanical-electrical measuring unit which is fastened to the base of the U-shaped optoelectronic measuring unit. Along with the movement of the optoelectronic measuring unit, the mechanical-electrical measuring unit is also guided along the shaft automatically so that the circumferential surfaces can be mechanically probed in this second measuring position. In so doing, reception of measurement values takes place perpendicular to the axis of rotation of the shaft within the axial plane so that the circumferential surfaces can be detected tactilely with high accuracy by the probing element. However, it allows accurate mechanical probing of circumferential surfaces exclusively. Surfaces disposed substantially orthogonal to the axis of rotation of the shaft can only be detected optically. In view of the fact that mechanically stable and, therefore, solid component parts are employed as a rule in order to maintain a high measuring accuracy of the device, it must be assumed that increased constructional expenditure is required to realize a precise displacement of the movably mounted U-shaped support between the two measuring positions.

SUMMARY OF THE INVENTION

It is the object of the invention to find a possibility for measuring form attributes, position attributes or dimension attributes of a rotatable machine element which also allows surfaces having a substantial inclination relative to the rotational axis up to orthogonal orientation relative to the rotational axis as well as hidden regions such as undercuts, slopes, and irregularities, etc. to be measured with high measuring accuracy and with a lower expenditure on construction and simultaneously with high precision.

In a device for measuring form attributes, position attributes or dimension attributes of a rotatable machine element comprising a mechanically stable machine bed with a linear guide arranged along the machine bed and a linear guide system arranged parallel to the linear guide, a workpiece holder for receiving the machine element so as to be rotatable around a rotational axis of the machine element, this workpiece holder having at least one clamping means which is received in the linear guide and around which the machine element is rotatable around the rotational axis, an optical measuring unit having an illumination module and a camera module which is movably arranged at a linear guide system and by which two-dimensional shadow images of the machine element can be captured, this machine element being rotatably arranged between the illumination module and oppositely located camera module, the above-stated object is met according to the invention in that the optical measuring unit has an additional, mechanical measuring unit having a tactile measuring probe for measuring the machine element in axial direction, wherein the mechanical measuring unit is fixed to the optical measuring unit and has a swiveling device for swiveling the tactile measuring probe in an orthogonal plane relative to the rotational axis of the machine element.

The tactile measuring probe advantageously has a one-dimensional measured value transducer which measures in two directions parallel to the rotational axis of the machine element and which has a stylus arm and at least one probing element, wherein the stylus arm has a length such that when the tactile measuring probe swivels inward the at least one probing element describes an arc that crosses at least the rotational axis of the machine element.

It has proven advisable that the tactile measuring probe has a stylus arm with two probe balls which are spaced apart in parallel direction with respect to the rotational axis of the machine element so that surfaces which are hidden by surrounding material can be measured axially.

The swiveling device for positioning the at least one probe ball of the tactile measuring probe is preferably continuously adjustable in a radius with respect to the rotational axis.

In an advantageous manner, the tactile measuring probe can be positioned in every axial position of the machine element through movement of the optical measuring unit along the linear guide system, and a probing movement can accordingly be realized at axially probeable surfaces.

It is advantageous when a calibrating body for calibrating the tactile measuring probe in axial direction of the rotational axis has at least two axially opposed reference surfaces which are orthogonal to the rotational axis and is fastened to the workpiece holder, and at least one of the reference surfaces thereof can be sensed respectively by the optical measuring unit and by the mechanical measuring unit.

The calibrating body can be a U-profile having two parallel inner surfaces which are arranged as reference surfaces orthogonal to the rotational axis.

In another advantageous variant, the calibrating body can be a rotational body which is arranged concentric to the rotational axis and which has a circumferential rectangular groove, and the parallely opposed inner surfaces of the rectangular groove are the reference surfaces which are arranged orthogonal to the rotational axis, the rotational body being fixed concentrically at clamping means.

The temperature of the calibrating body can advantageously be detected by means of a temperature sensor, and a measured length standard between the reference surfaces can be corrected to a reference temperature taking into account the temperature dependence of the calibrating body, taking into account the thermal expansion coefficient thereof.

The above-stated object is further met in a method for measuring form attributes, position attributes and dimension attributes of rotatable machine elements through the following steps:
a) clamping a machine element into at least one rotatable clamping means of a workpiece holder for rotation of the machine element around a rotational axis;
b) optically measuring portions of the machine element by acquiring shadow images in a beam path of an optical measuring unit, which beam path is directed orthogonal to the rotational axis, accompanied by rotation of the machine element around the rotational axis for determining from the shadow images form attributes, position attributes and dimension attributes and positions of axially probeable surfaces;
c) moving the optical measuring unit to the positions of axially probeable surfaces of the machine element, which positions are determined by the optical measuring unit, for positioning a mechanical measuring unit with tactile measuring probe corresponding to the optically determined positions of axially probeable surfaces;
d) tactilely measuring axial distance values of axially opposed surfaces of the machine element by swiveling a tactile measuring probe coupled to the optical measuring unit into orthogonal planes which are located opposite the surfaces to be probed by probing these surfaces with the tactile measuring probe.

The tactile measurement of axially opposed surfaces which are separated from one another by air is preferably carried out in such a way that points of the axially opposed surfaces at the same radial distance from the rotational axis are alternately probed by the tactile measuring probe and represent a length measurement for every selected radial distance, the tactile measuring probe having been calibrated beforehand to a calibrated length standard with two parallely opposed reference surfaces which are oriented orthogonal to the rotational axis.

Further, it is possible to carry out the tactile measurement of axially opposed surfaces in such a way that the axial position of one of the surfaces is acquired by the optical measuring unit and that of the other surface is acquired by the tactile measuring probe, the optical measuring unit and the mechanical measuring unit having been calibrated to one another beforehand, in that an offset value between the measuring positions of the optical measuring unit and of the mechanical measuring unit is determined at a reference surface.

Further, it is advisable that measured values of the tactile measuring probe are captured in one or more tracks concentric to the rotational axis and are used to calculate form attributes, wherein the machine element is rotated around the rotational axis.

The calibrated length standard for at least one calibrating step is preferably used before the commencement of optical measurement.

BRIEF DESCRIPTION OF THE DRAWINGS

The invention will be described more fully in the following with reference to embodiment examples. The accompanying drawings show.

DETAILED DESCRIPTION OF THE PREFERRED EMBODIMENTS

Figure 1:
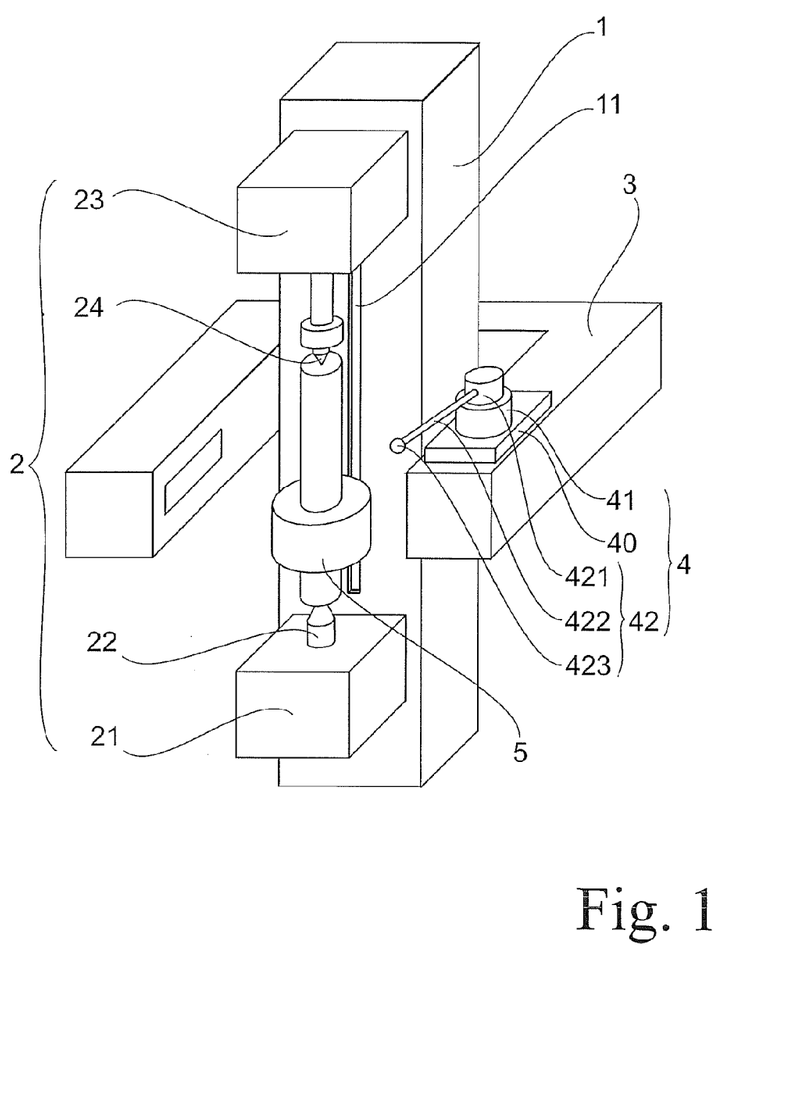
FIG. 1 an illustration of the basic construction of the device according to the invention in an overall view of the measuring machine.

The basic construction of the device is shown in FIG. 1. The device substantially comprises a mechanically stable machine bed 1 at which a workpiece holder 2 and an optical measuring unit 3 are movably arranged. The workpiece holder 2 has a driven center 22 and a live or revolving center 24 forming a rotational axis 6 and between which a machine element 5 can be received on the rotational axis 6. The optical measuring unit 3 is arranged so as to face the machine element 5 on both sides of the rotational axis 6. For optical measurement of the machine element 5, the optical measuring unit 3 has an illumination module 31 on one side of the rotational axis 6 and a camera module 33 on the opposite side of the rotational axis 6. A swiveling device 41 is fixedly arranged on one side of the optical measuring unit 3. The swiveling device 41 has a mechanical measuring unit 4 which is swivelable orthogonal to the rotational axis 6.

The workpiece holder 2 comprises a headstock 21 which is fixedly arranged at one end of the machine bed 1 and a tailstock 23 which is movably arranged at the machine bed 1. A linear guide 11 extending along the machine bed 1 is arranged at the machine bed 1 for the movement the tailstock 23. At linear guide 11, the tailstock 23 can be moved relative to the headstock 21 and fixedly clamped in the linear guide 11 in any position. The headstock 21 is provided with a rotatable, driven center 22 and the tailstock 23 is provided with a revolving, live center 24. The axes of the driven center 22 and revolving center 24 are oriented coaxially with respect to one another. The driven center 22 and the revolving center 24 face one another so that the machine element 5 can be rotatably received therebetween at corresponding centering bores of the machine element 5. A defined force is exerted on the machine element 5 by the revolving center 24 so that a frictional engagement results between the driven center 22 and the centering bore of the machine element 5. The machine element 5 can be set in rotation by the driven center 22 through the frictional engagement. The driven center 22 is connected to a precision angle measuring system (not shown) for precisely determining the angular position of the rotating machine element 5.

Figure 7:
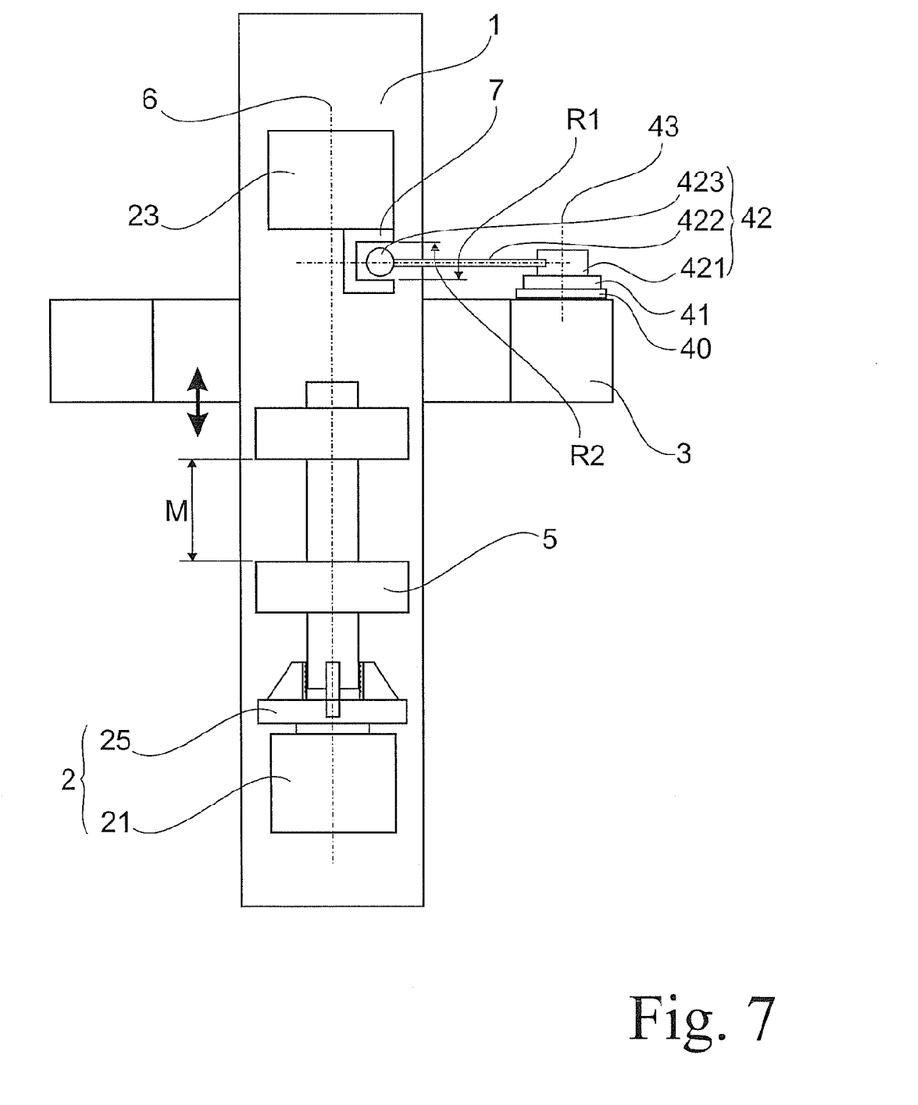
FIG. 7 another variant for the calibration of the tactile measuring probe on a static length standard.

In an embodiment of the device, it can also be sufficient to receive the machine element 5 on only one side at the headstock 21. As is shown in FIG. 7, a jaw-type chuck or collet chuck in which the machine element 5 is clamped and, if necessary, can also be rotated around the rotational axis 6 is arranged at the headstock 21 for receiving the machine element 5.

The optical measuring unit 5 which is likewise received at the machine bed 1 is U-shaped and is movably fastened to the machine bed 1 at the surface of the base of the U-shape so that the parallel legs of the optical measuring unit 3 are oriented so as to project out on both sides perpendicularly from the machine bed 1. To receive the optical measuring unit 3, a linear guide system 12 (arranged at the back side of the machine element and not visible in FIG. 1) is arranged so as to extend parallel to the linear guide 11 along the machine bed 1. The linear guide system 12 can comprise two high-precision sliding rails running parallel. The optical measuring unit 3 is received at the sliding rails of the linear guide system 12 by means of corresponding bearings by which the optical measuring unit 3 can be moved along the machine bed 1.

Figure 2A:
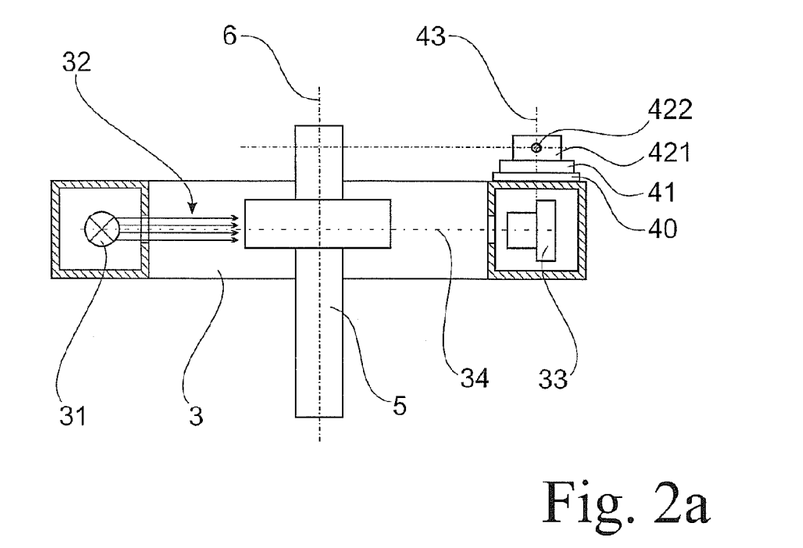
FIG. 2a a sectional front view of the optical measuring unit combined with a mechanical measuring unit in the form of a swivelable tactile measuring probe.

As is shown in FIG. 2a in a view from the front, an illumination module 31 is integrated in one leg end of the optical measuring unit 3 and a camera module 33 is integrated in the other leg end of the optical measuring unit 3 for carrying out an optical measurement. Owing to the mechanically stable construction of the optical measuring unit 3, the illumination module 31 and the camera module 33 face one another on a static optical axis 34 so that a light bundle 32 emitted by the illumination module 31 can be detected by the camera module 33. The illumination module 31 and the camera module 33 are arranged orthogonally and on both sides of the workpiece holder 2 so that the rotational axis 6 of the workpiece holder 2 is positioned approximately in the center of the light bundle 32 as is shown in a top view in FIG. 2b.

Figure 2B:
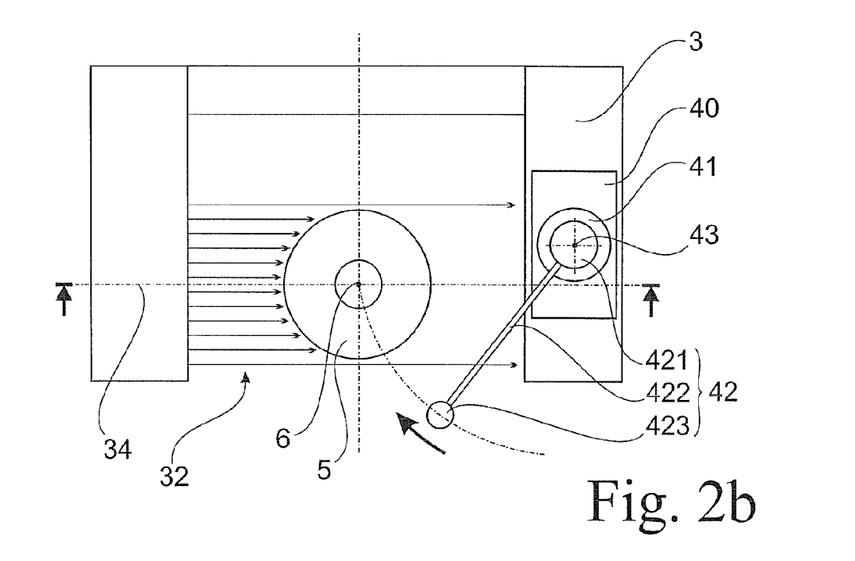
FIG. 2b the combined measuring unit in a top view with the tactile measuring probe during the swiveling-in movement.

The light bundle 32 of the optical measuring unit 3 can be moved along the rotational axis 6 of the workpiece holder 2 by the movement of the optical measuring unit 3 along the linear guide system 12. Accordingly, the machine element 5 received in the workpiece holder 2 can be detected in its entirety. To this end, the machine element 5 is illuminated by the illumination module 31 and a resulting shadow image is captured by the camera module 33. A two-dimensional contour of the machine element 5 can be generated from the shadow image and can be used to calculate metrological quantities of the machine element 5 such as length, diameter, parallelism, straightness, angle or radius.

It is also possible to leave the optical measuring unit 3 stationary and to move the machine element 5 around the rotational axis 6. While simultaneously determining the angular position of the machine element 5 rotating around the rotational axis 6, a contour of the machine element 5 can be acquired in a sectional plane parallel to the rotational axis 6 and various metrological quantities such as rotational angle-dependent position, runout and roundness can be calculated therefrom. Further metrological quantities such as, e.g., cylindrical shape, concentricity and overall runout can be calculated from the combination of a plurality of such contours.

In addition to the optical measuring unit 3, the device has the mechanical measuring unit 4. As is shown in FIG. 1, the mechanical measuring unit 4 comprises the swiveling device 41 which is fixedly connected to one of the legs of the optical measuring unit 3 by a stable base plate 40. A tactile measuring probe 42 comprising a measured value transducer 421 with a stylus arm 422 and a probing element 423 terminating the stylus arm 422 is fastened to the swiveling device 41. As is shown in the top view in FIG. 2b, the swiveling device 41 together with the tactile measuring probe 42 can carry out a continuous swiveling movement around a swiveling axis 43 disposed parallel to the rotational axis 6. The tactile measuring probe 42 is arranged with its stylus arm 422 orthogonal to the swiveling axis 43 so that the latter can occupy any intermediate position between a position outside the machine element 5 and a position inside the machine element 5.

As is shown in FIGS. 2a to 2d for the probing of a surface of the machine element 5 oriented completely orthogonal to the rotational axis 6, the mechanical measuring unit 4 is configured exclusively for measuring axially probeable surfaces of the machine element 5. Therefore, the tactile measuring probe 42 is constructed as a one-dimensional measuring probe whose stylus arm 422 can be deflected in both directions parallel to the rotational axis 6. Accordingly, axially probeable surfaces can be probed and measured in both directions of the rotational axis 6. The positioning of the mechanical measuring unit 4 along the rotational axis 6 and the probing movement of the mechanical measuring unit 4 at axially probeable surfaces of the machine element 5 are both carried out by means of the movement of the optical measuring unit 3. Compared with measurements taken with the optical measuring unit 3, a substantially higher accuracy can be achieved with the mechanical measuring unit 4, especially when measuring planarity, axial runout, rectangularity and distance values M of axially probeable surfaces of the machine element 5 which are oriented orthogonal to the rotational axis.

Figure 3A:
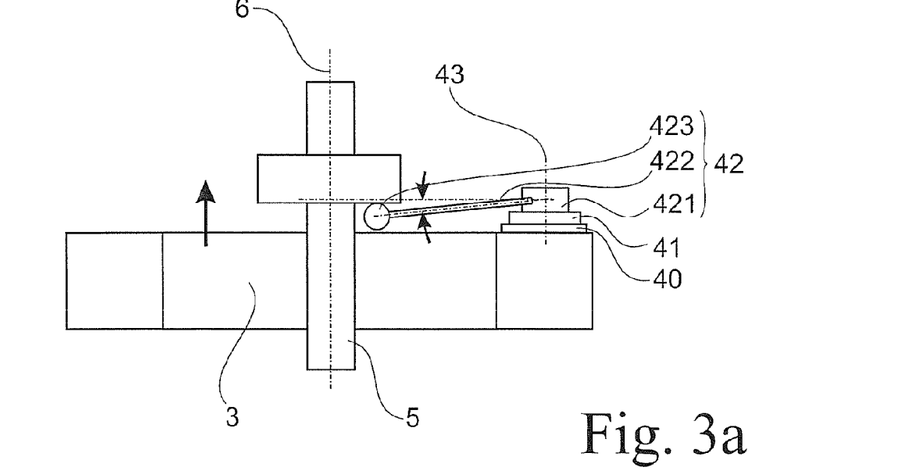
FIG. 3a the probing of an axially probeable surface from below by means of the tactile measuring probe.
Figure 3B:
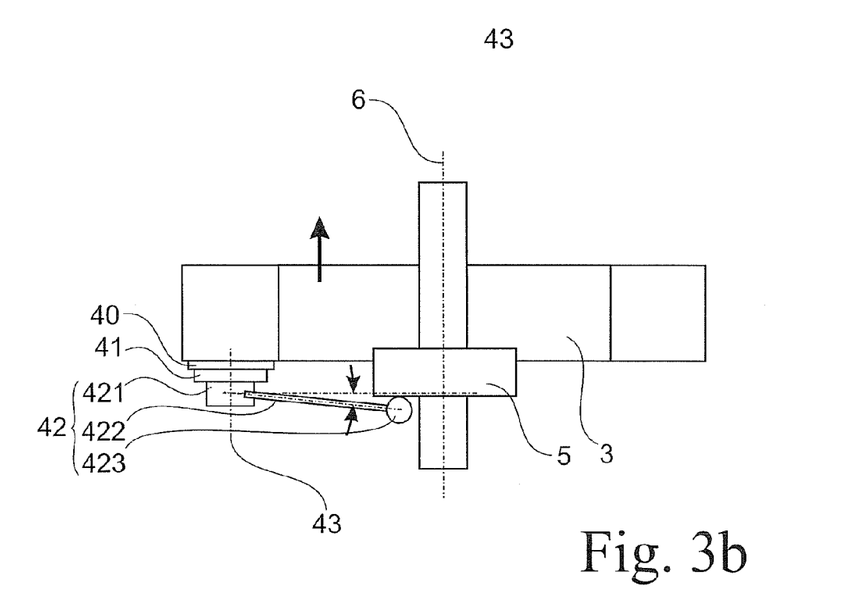
FIG. 3b the probing of an axially probeable surface from below with a tactile measuring probe fastened to another location of the optical measuring unit.

As is shown in FIG. 3a and FIG. 3b with two exemplary positions, the swiveling device 41 can be arranged at different locations of the optical measuring unit 3. The figures show the measurement of one and the same axially probeable surface by two differently positioned mechanical measuring units 4. The swiveling device 41 can be arranged at the leg of the optical measuring unit 3 on the side facing the headstock 21 or on the side facing the tailstock 23. The position of the mechanical measuring unit 4 is immaterial with regard to carrying out the measurement, provided that the length of the stylus arm 422 and the position of the swiveling axis 43 relative to the rotational axis 6 are selected in such a way that the tactile measuring probe 42 can be tangent to the rotational axis 6 (FIG. 2b) during an arcuate swiveling-in movement with the probing element 423. This restriction ensures that any radial position of the machine element 5 clamped in the workpiece holder 2 can be reached by the tactile measuring probe 42.

Depending on the shape and position of the axially probeable surfaces to be measured, the geometry can be adapted to the probing elements 423 employed. A probing ball arranged at the end of the stylus arm 422 can be used as a probing element 423 in a particularly advantageous manner and can be used for a wide variety of measurement tasks. However, other probing elements 423 can also be used, e.g., cylinders, tips or sheaths which are better able to reach poorly accessible surfaces.

Figure 4:
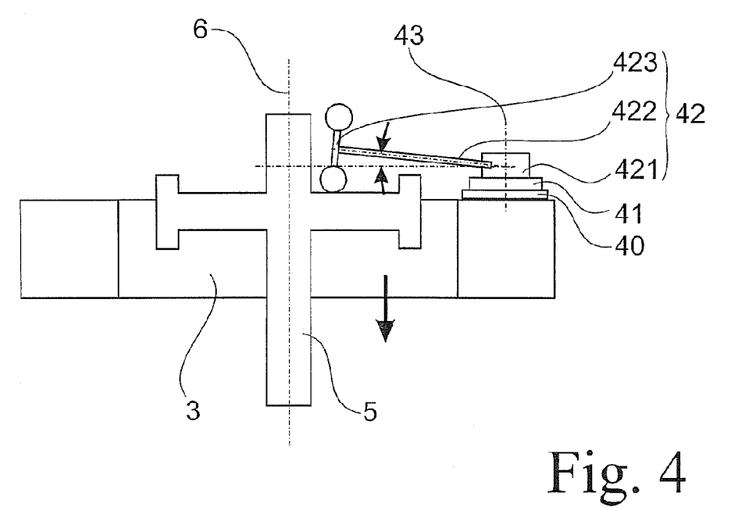
FIG. 4 a first example of the probing of a hard-to-reach axially probeable surface with adapted probing element of the tactile measuring probe.

A special construction of the stylus arm 422 can be used for axially probeable surfaces which, as is shown in FIG. 4, lie behind outer structures of the machine element 5 and which cannot be reached by a straight stylus arm 422 with probing element 423. This special construction of the stylus arm 422 has two probing elements 423 in the form of probing balls which are arranged at the end of the stylus arm 422 at a distance from one another in parallel direction to the rotational axis 6.

In the method according to the invention for measuring form attributes, position attributes and dimension attributes, a corresponding machine element 5 is clamped in a rotatable workpiece holder 2 in a first method step. Aside from two locating centers, one-sided clamping means such as jaw-type chucks with three, four or six jaws or collet chucks can be used as a rotatable workpiece holder 2. The machine elements 5 may be engine shafts and transmission shafts, thrust rods, valves, pistons, screws, turbine parts, or the like, which are fixedly received in the workpiece holder 2 so that they can be rotated around their rotational axis 6.

In the next method step, the machine element 5 can be measured optically. To this end, shadow images of the machine element 5 are captured by an optical measuring unit 3. The shadow images are generated in the beam path of the optical measuring unit 3, which beam path is directed orthogonal to the rotational axis 6.

For optical measurement, contours can be captured portion by portion in that the rotational axis 6 remains stationary and the measuring unit 3 is moved parallel to the rotational axis 6 or in that the machine element 5 is rotated around the rotational axis 6 while the measuring unit 3 stays in one position. Form attributes, position attributes and dimension attributes of the machine element can be detected very quickly in this way.

The positions of axially probeable surfaces of the machine element 5 can also be determined easily from the optical measurement. Corresponding to these optically detected positions of the axially probeable surfaces, a mechanical measuring unit 4 with a tactile measuring probe 42 can be positioned for measuring these surfaces in the next method step. The positioning is carried out by a movement of the optical measuring unit 3 along the linear guide system 12 (shown only in FIG. 6). The optical measuring unit 3 is positioned in such a way that the tactile measuring probe 42 of the mechanical measuring unit 4 can be swiveled into the machine element 5 without collision in an orthogonal plane opposite to the surface to be measured.

The tactile measurement of the axially probeable surfaces is carried out in the final method step. To this end, the tactile measuring probe 42 is swiveled into the machine element 5 from an initial position outside the machine element 5 (see FIGS. 2b, 2c) until reaching a desired radial position relative to the rotational axis 6 in which the probing of the surface to be measured is carried out by the tactile measuring probe 42 through a movement of the optical measuring unit 3.

The measurement of distance values M between two axially probeable surfaces of a machine element 5 will be explained in detail by way of two examples.

Figure 2C:
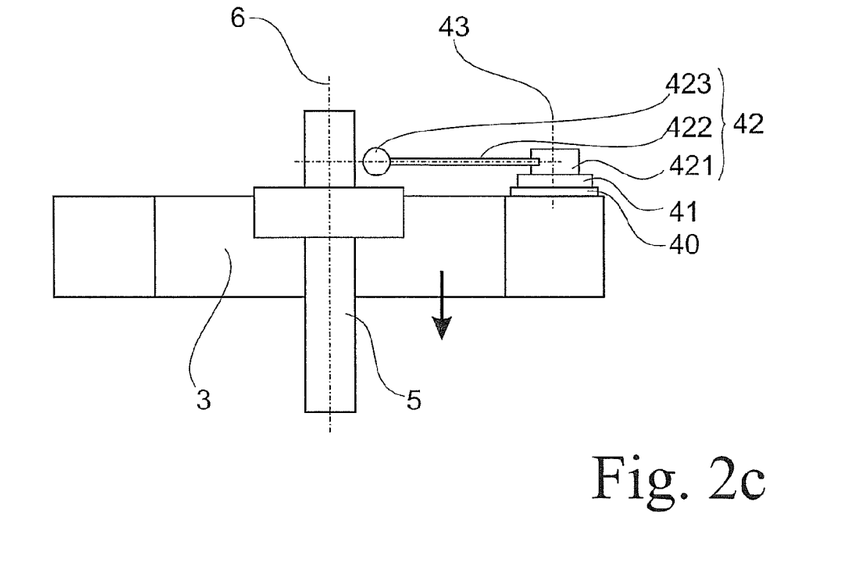
FIG. 2c the combined measuring unit with swiveled-in measuring probe in a probing movement.
Figure 2D:
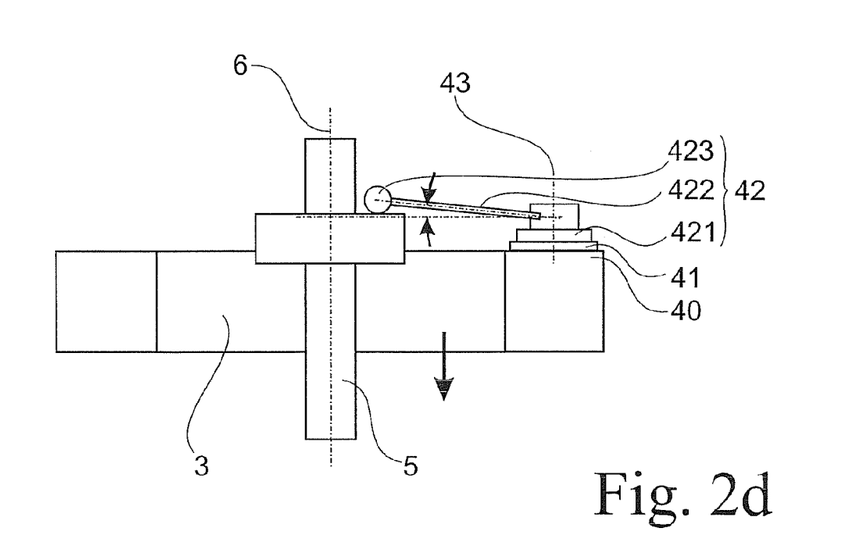
FIG. 2d the combined measuring unit with swiveled-in measuring probe during the probing of an axially probeable surface from above.

In a first example, the measurement of a distance value M is carried out at two opposing surfaces separated from one another by material of the machine element 5. The measurement can be described referring to FIG. 2a to FIG. 2d and is carried out by a combined application of optical and tactile measuring methods. The relevant portion of the machine element 5 (in FIGS. 2a to 2d, the region of the machine element 5 with the greater diameter and the two plane surfaces of this portion which are oriented orthogonal to the rotational axis 6) is initially detected in its entirety by the optical measuring unit 3. The positions of the two axially probeable surfaces (FIG. 2a) are determined from the captured shadow image. Subsequently, the tactile measuring probe 42 is initially moved by the optical measuring unit 3 into the orthogonal plane which is known from the optical measurement and which is located opposite one of the axially probeable surfaces (in FIG. 2a, the surface above the portion of the machine element 5 to be measured), and the tactile measuring probe 42 is swiveled into the area of the machine element 5 as is shown in FIG. 2b. As soon as the tactile measuring probe 42 has reached a desired radial position relative to the rotational axis 6, the probing movement of the tactile measuring probe 42 is carried out by means of the optical measuring unit 3 as is shown in FIG. 2c. The probing movement is continued until the tactile measuring probe 42 is positioned on the axially probeable surface and, as is shown in FIG. 2d, achieves a deflection necessary for acquiring the measurement value. Axial positions which cannot be measured with sufficient accuracy, if at all, because of concealed surface regions in the shadow image or invisible elements can be measured in this way.

The measuring of the distance value M of the two surfaces from the example given above can also be carried out in that the axial position of a surface is detected tactilely and the axial position of the other surface is detected optically.

Figure 5:
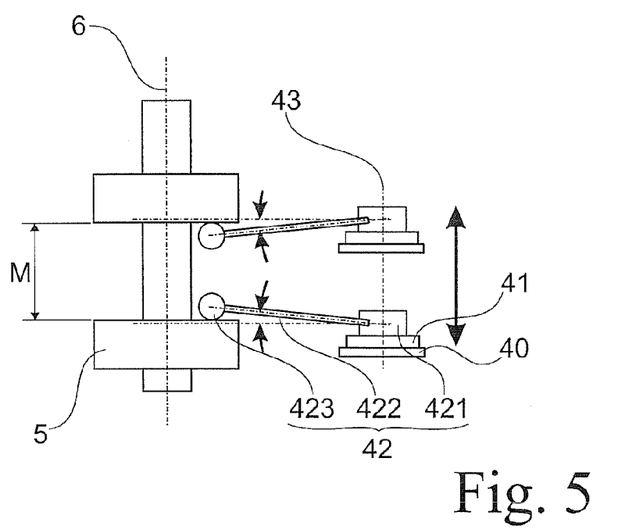
FIG. 5 a second example for the tactile measurement of an axial distance value between two axially probeable surfaces.

A second example is shown in FIG. 5. In this case, the axially probeable surfaces to be measured are located opposite one another and are separated from one another only by air. A quick optical measurement can also be carried out in this case beforehand in order to determine the position of the two surfaces. For mechanical measurement of the distance value, the tactile measuring probe 42 can now be swiveled into any orthogonal plane between the two surfaces of the machine element 5. The measurement of the two surfaces is carried out through a movement of the optical measuring unit 3 in both directions parallel to the rotational axis 6 such that, at this radial position, one surface can be probed from below and the other surface can be probed from above, and a distance value M is determined for this radial position. Due to the fact that the tactile measuring probe 42 remains in an unchanged radial position during this measurement, measuring errors which could occur due to swiveling movements of the tactile measuring probe 42 can be ruled out in this case so that a very accurate measurement result can be expected.

In a combined optical and mechanical measurement for detecting the entire machine element 5 having a plurality of portions which are to be measured and which have axially probeable surfaces, the sequence can be configured differently as described below.

One possibility consists in that all portions of the machine element 5 are first measured optically in the first method step. This can be carried out by a movement of the optical measuring unit along the machine element 5 in which a successive captured shadow image of the entire machine element 5 is acquired. Subsequently, all relevant portions are probed and measured successively by the mechanical measuring unit 4 in further tactile measurement substeps.

An alternative possibility consists in that the machine element 5 is measured optically and tactilely portion by portion in successive method steps. After a first portion of the machine element 5 has been optically and tactilely detected, the measuring units 3 and 4 are moved to the following portion, and this portion is measured until the machine element 5 has been detected in its entirety.

In order to provide a very accurate measurement, it is necessary to calibrate the measuring units before or during the measurement of a machine element 5. The calibrating steps must be carried out in both method sequences mentioned in the examples and also in all other variations of the method. The calibrating sequence depends on the combination of measuring units used for measuring the axially probeable surfaces.

Figure 6:
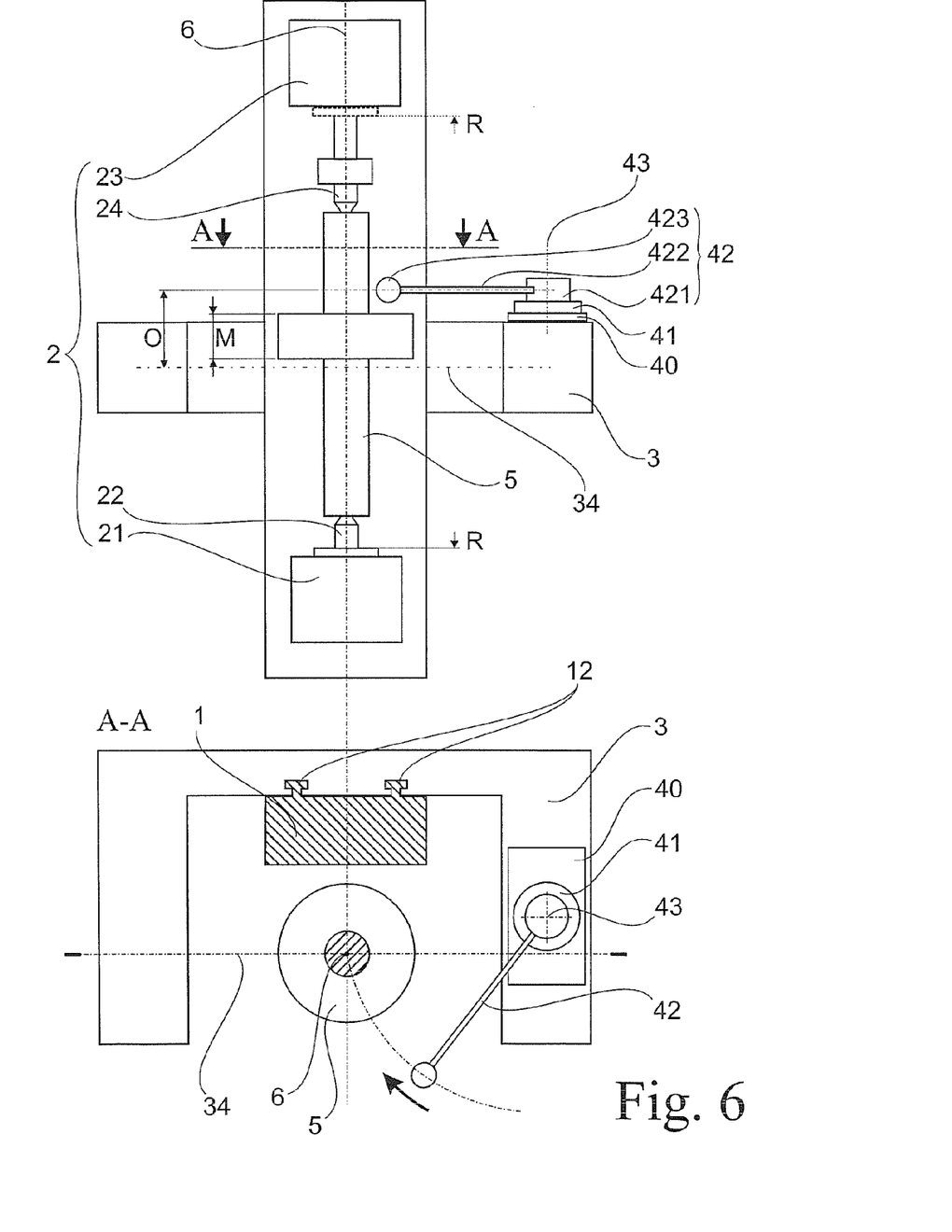
FIG. 6 a possible variant for determining the offset value between tactile measuring probe and optical measuring unit (calibration) in a front view and top view of the device.

In a first variant of the measuring method for measuring axially probeable surfaces in which the optical measuring unit 3 and the mechanical measuring unit 4 are used in conjunction, an exact offset value O which corresponds to the distance value between the optical axis 34 of the optical measuring unit 3 and the probing element 423 of the tactile measuring probe 42 must be determined at least before the commencement of measuring and also possibly during measurement. As is shown in FIG. 6, a reference surface R which can be probed by both measuring units 3 and 4 is required for this purpose. In FIG. 6, the reference surface R is integrated in the headstock 21. The measurement of the distance value is to be carried out by detecting the reference surface R both optically and tactilely. The offset value O can then be determined from the difference between the two measured values. Insofar as the reference surface R can be probed by both the optical measuring unit 3 and the mechanical measuring unit 4, the position of the reference surface R is not important. Therefore, as is illustrated in dashed lines at the tailstock 23 in FIG. 6, it can also be arranged alternatively at other positions of the workpiece holder 2 or at surfaces in a fixed relationship with the latter.

In a second variant of the measuring method for measuring axially probeable surfaces in which opposed axially probeable surfaces separated by air are to be probed from opposite directions, the calibration that is required at least prior to measurement is carried out in another way. Since the probing of the two opposing axially probeable surfaces can be carried out exclusively tactilely in this distance value measurement, a length standard is required which has two opposing reference surfaces which are likewise separated by air.

As is shown in FIG. 7, in an embodiment form of the length standard, a U-profile 7 is arranged on one side at the tailstock 23, the reference surfaces R1 and R2 being embodied by the inside parallel surfaces of this U-profile 7. Through additional optical measurement of the two reference surfaces R1 and R2, offset values O (shown only in FIG. 6) between the optical measuring unit 3 and the mechanical measuring unit 4 can be determined for both probing directions.

The two reference surfaces R1 and R2 are probed one after the other by the tactile measuring probe 42 and the determined measurement values are stored as a length standard and used to normalize the axial distance measurement values of the machine element 5 probed by the tactile measuring probe 42. Immediately thereafter, the distance measurement can be carried out with maximum accuracy. The normalization can also be repeated as often as desired during the measurement if necessary.

Figure 8:
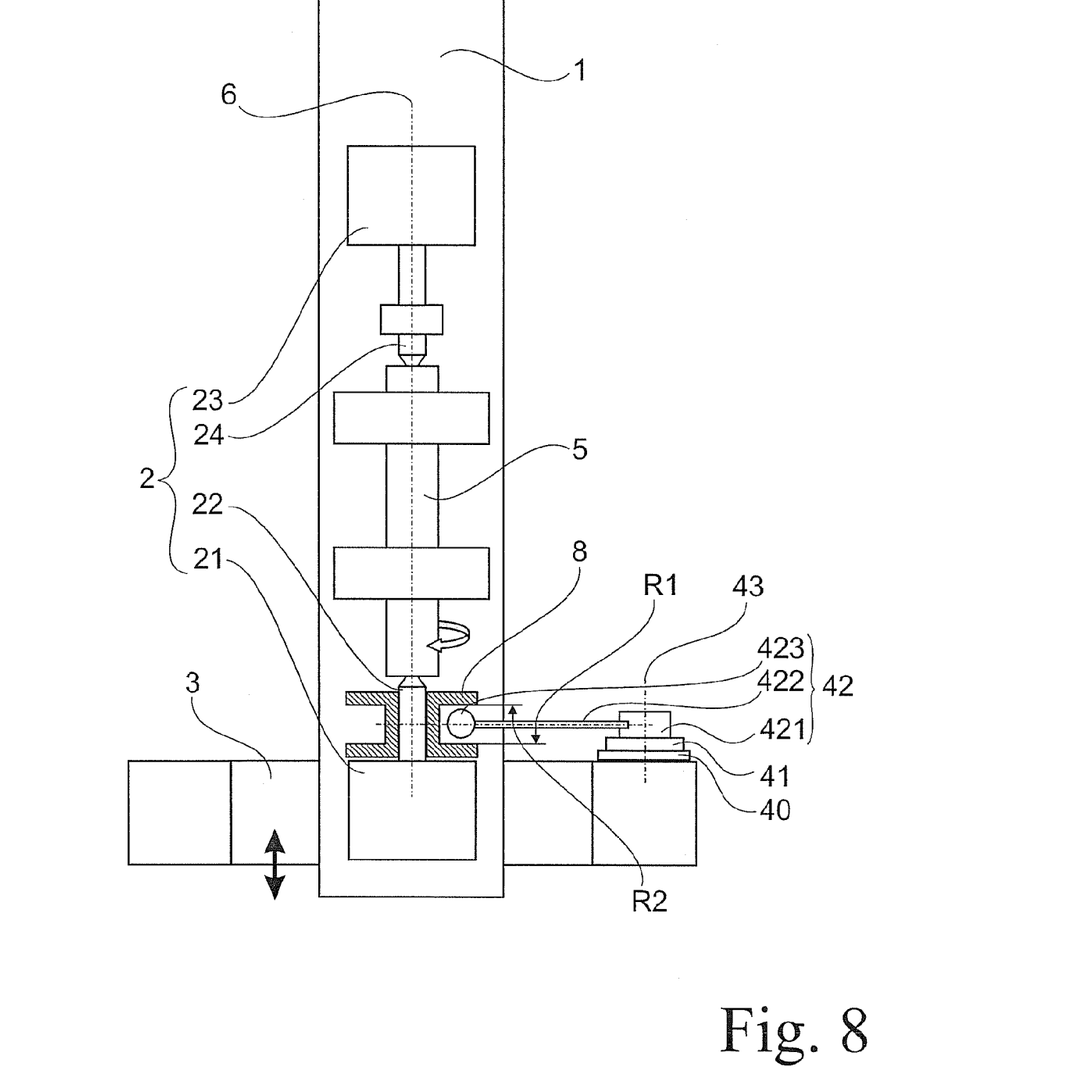
FIG. 8 another embodiment form for the calibration of the tactile measuring probe on a rotating length standard.

Another embodiment form of the length standard is shown in FIG. 8. Here, the same principle is applied as with the U-profile 7 described in FIG. 7. In this case, it is embodied as a rotational body 8 which is arranged concentric to the rotational axis 6 at the headstock 21 or at the tailstock 23 along the circumference thereof. The two parallely opposed reference surfaces R1 and R2 of the rectangular groove form the length standard.

A further increase in accuracy can be achieved in that the measured length standard between reference surfaces R1 and R2 can be adapted as a function of a determined temperature difference of the U-profile 7 or of the rotational body 8. To this end, the temperature of the U-profile 7 or rotational body 8 is continuously detected by means of a temperature sensor (not shown) and the measured length standard between the reference surfaces R1 and R2 is corrected by a factor which takes into account the thermal expansion coefficient corresponding to the temperature change.

LIST OF REFERENCE NUMERALS 1 machine bed
11 linear guide
12 linear guide system
2 workpiece holder
21 headstock
22 driven center
23 tailstock
24 revolving center
25 jaw chuck
3 optical measuring unit
31 illumination module
32 light bundle
33 camera module
34 optical axis
4 mechanical measuring unit
40 base plate
41 swiveling device
42 tactile measuring probe
421 measured value transducer
422 stylus arm
423 probing element
43 swiveling axis
5 machine element
6 rotational axis
7 calibrated length standard
8 rotational body
M distance value
O offset value between optical measuring unit and mechanical measuring unit
R/R1/R2 reference surface

What is claimed is:
1. A device for measuring form attributes, position attributes or dimension attributes of rotatable machine elements, the device comprising:
 a mechanically stable machine bed with a linear guide disposed along the machine bed and a linear guide system arranged in parallel to the linear guide;
 a workpiece holder for receiving a machine element rotatable around a rotational axis of the machine element, wherein the workpiece holder comprises at least one clamping means which is received in the linear guide and around which the machine element is rotatable around the rotational axis, and
 an optical measuring unit comprising an illumination module and a camera module which is movably arranged at a linear guide system for capturing two-dimensional shadow images of the machine element at different positions along the rotational axis, wherein the camera module and the illumination module being located oppositely to each other and being together moveable relatively to the machine element rotatably arranged therebetween, the optical measuring unit comprising an additional mechanical measuring unit having a tactile measuring probe for measuring defined surfaces of the machine element in axial direction, wherein the mechanical measuring unit is fixed to the optical measuring unit and has a swiveling device for swiveling the tactile measuring probe in an orthogonal plane relative to the rotational axis of the machine element.

2. The device according to claim 1, wherein the tactile measuring probe comprises a one-dimensional measured value transducer for taking measurements in two directions parallel to the rotational axis of the machine element, the measuring probe comprising a stylus arm and at least one probing element, wherein the stylus arm has a length such that, when the tactile measuring probe swivels inward, the at least one probing element moves along an arc that crosses at least the rotational axis of the machine element.

3. The device according to claim 2, wherein the tactile measuring probe comprises the stylus arm with two probe balls spaced apart in a parallel direction with respect to the rotational axis of the machine element so that surfaces which are hidden by surrounding material can be touched for tactile measurements in an axial direction.

4. The device according to claim 2, wherein the swiveling device for positioning the at least one probe ball of the tactile measuring probe is infinitely adjustable in any radius with respect to the rotational axis.

5. The device according to claim 1, wherein the tactile measuring probe can be positioned in every axial position of the machine element via a motion of the optical measuring unit along the linear guide system, so that a probing movement can be realized at any axially probeable surfaces.

6. The device according to claim 1, further comprising a calibrating body for calibrating the tactile measuring probe in axial direction of the rotational axis, the calibrating body being fastened to the workpiece holder and comprising at least two axially opposed reference surfaces (R1; R2) orthogonal to the rotational axis, wherein at least one of the reference surfaces can be sensed respectively by the optical measuring unit and by the mechanical measuring unit.

7. The device according to claim 6, wherein the calibrating body has a U-profile having two parallel inner surfaces which are arranged as the reference surfaces (R1; R2) orthogonal to the rotational axis.

8. The device according to claim 6, wherein the calibrating body is a rotational body which is arranged concentrically to the rotational axis and which has a circumferential rectangular groove, wherein the reference surfaces (R1; R2) are the parallel opposed inner surfaces of the rectangular groove arranged orthogonally to the rotational axis, and wherein the rotational body is fixed concentrically at the clamping means.

9. The device according to claim 6, wherein the temperature of the calibrating body can be detected by a temperature sensor and a measured length standard between the reference surfaces R1 and R2 is corrected to a reference temperature by taking into account a temperature dependence of the calibrating body and a thermal expansion coefficient thereof.

10. A method for measuring form attributes, position attributes and dimension attributes of rotatable machine elements, the method comprising:
    a) clamping a machine element into at least one rotatable clamping means of a workpiece holder for rotation of the machine element around a rotational axis;
    b) optically measuring portions of the machine element by acquiring shadow images in a beam path of an optical measuring unit, the beam path being directed orthogonally to the rotational axis while rotating the machine element around the rotational axis to determine the form attributes, position attributes, dimension attributes and positions of axially probeable surfaces from the shadow images;
    c) moving the optical measuring unit to the positions of axially probeable surfaces of the machine element for positioning a mechanical measuring unit with a tactile measuring probe corresponding to the optically determined positions of axially probeable surfaces; and
    d) tactilely measuring axially opposed surfaces of the machine element by swiveling the tactile measuring probe coupled to the optical measuring unit in orthogonal planes located opposite the surfaces to be probed and by axial probing these surfaces with the tactile measuring probe.

11. The method according to claim 10, wherein tactilely measuring the axially opposed surfaces separated from one another by air is carried out by alternately probing points having the same radial distance from the rotational axis at the axially opposed surfaces, being directly successively touched by the tactile measuring probe and thus representing a length measurement for every selected radial distance, and further comprising calibrating the tactile measuring probe beforehand to a calibrated length standard with two parallel opposed reference surfaces (R) oriented orthogonally to the rotational axis.

12. The method according to claim 10, wherein tactilely measuring axially opposed surfaces is carried out by acquiring the axial position of one of the surfaces by the optical measuring unit and acquiring the axial position of the other surface by the tactile measuring probe, and further comprising calibrating beforehand the optical measuring unit and the mechanical measuring unit to one another by determining an offset value (O) between measuring positions of the optical measuring unit and of the mechanical measuring unit at a reference surface (R).

13. The method according to claim 10, further comprising capturing measured values of the tactile measuring probe in one or more tracks concentric to the rotational axis to calculate form attributes while the machine element is rotated around the rotational axis.

14. The method according to claim 11, further comprising using the calibrated length standard for at least one calibrating step before commencing an optical measurement.

* * * * *